United States Patent [19]

Shibuya et al.

[11] Patent Number: 4,780,772
[45] Date of Patent: Oct. 25, 1988

[54] APPARATUS FOR REPRODUCING DIGITAL SIGNALS FROM A DIGITAL AUDIO RECORDING MEDIUM

[75] Inventors: Toshifumi Shibuya; Takao Arai, both of Yokohama; Hiroshi Endoh, Toyokawa, all of Japan

[73] Assignee: Hitachi, Ltd., Tokyo, Japan

[21] Appl. No.: 902,562

[22] Filed: Sep. 2, 1986

[30] Foreign Application Priority Data

Sep. 13, 1985 [JP] Japan ............................ 60-201497
Nov. 6, 1985 [JP] Japan ............................ 60-247053

[51] Int. Cl.<sup>4</sup> ........................... G11B 5/02; G11B 5/09
[52] U.S. Cl. ......................................... 360/51; 369/59
[58] Field of Search ................. 360/51, 13, 26, 27, 360/32, 73; 370/84; 375/106; 358/140, 11; 369/48, 49, 50, 59

[56] References Cited

U.S. PATENT DOCUMENTS 3,749,889 7/1973 Vaskunas et al. ............... 360/51
3,974,523 8/1976 Miller et al. ..................... 360/51
4,215,430 7/1980 Johnson, Jr. ..................... 360/51

FOREIGN PATENT DOCUMENTS 0066518 4/1982 Japan ............................... 360/51
59-124012 7/1984 Japan .

Primary Examiner—Raymond F. Cardillo
Assistant Examiner—Kevin Fournier
Attorney, Agent, or Firm—Antonelli, Terry & Wands

[57] ABSTRACT

A digital signal reproducing apparatus in which the frequency of a basic clock signal generated from a clock generator having a fixed oscillation frequency is divided to produce a clock signal used for processing a digital signal, and, when the transmission speed of the digital signal is changed, the frequency division ratio is also changed to produce a clock signal synchronous with the digital signal transmitted at the changed transmission speed.

3 Claims, 10 Drawing Sheets

APPARATUS FOR REPRODUCING DIGITAL SIGNALS FROM A DIGITAL AUDIO RECORDING MEDIUM

BACKGROUND OF THE INVENTION

This invention relates to an apparatus for reproducing a digital signal from a digital audio recording medium (a disk, a tape or the like), and more particularly to a digital signal reproucing circuit suitable for use in a system where the transmission speed of a digital signal is variable.

A compact disk player (referred to hereinafter as a CD player) using a compact disk (a CD) is now popular as a home-use digital signal reproducing apparatus which can reproduce a high-quality music signal from the disk. Very small concavities called pits are engraved on this disk to record a digital signal, and, when the disk is rotated in the playback mode, an optical pickup detects the pits to reproduce the digital signal recorded on the disk. After processing the reproduced digital signal for error correction, etc., the digital signal is applied to a digital-analog converter (a DAC) to reproduce the original music signal.

In order that the CD player can accurately reproduce the music signal, a signal processing circuit is required which controls the CD player so as to rotate the disk at a predetermined rotation speed based on a fixed frequency. The processing circuit is also required to reproduce a clock signal synchronous with the digital signal reproduced from the disk so as to fetch data, and, after processing including error correction, delivers the data sampled at a sampling frequency based on the fixed frequency.

A prior art signal processing circuit of this kind is disclosed in, for example, JP-A-58-219852 and JP-A-59-124012. According to the disclosed circuit, the rotation control of a disk and the signal processing for the output of data are performed on the basis of an oscillation frequency of a single crystal oscillator, and a clock signal for data fetching purpose is produced by a PLL circuit to be synchronized with the data. Such a signal processing circuit carries out its processing operation normally in an ordinary playback mode. However, no consideration has been taken for the reproduction of a music signal at a variable speed, for example, double speed, as when the disk is rotated at double speed (a speed two times as high as that in the ordinary playback mode) for the purpose of dubbing of the reproduced music signal on a cassette tape run at double speed.

In a digital audio tape recorder (a DAT recorder) using a magnetic tape, the magnetic tape 80 is wound over an angle of about 90° around part of a rotary cylinder 81 having a diameter a as shown in (A) of FIG. 9, and a digital signal is reproduced from the magnetic tape 80 by rotary magnetic heads 82A and 82B provided on the rotary cylinder 81. Since, in this case, the rotary magnetic heads 82A and 82B are disposed at an angular interval of 180° therebetween on the cylinder 81, the digital signal is intermittently reproduced as shown in (A) of FIG. 10. In such a case, the period of signal presence is equal to the period of signal absence.

On the other hand, in the case of, for example, high-speed dubbing of such a magnetic tape 80, the magnetic tape 80 is run at a high speed, and the speed of scanning with the rotary magnetic heads is also increased. Suppose now that the magnetic tape 80 is wound over an angle of about 45° around part of a rotary cylinder 83 having a diameter 2a as shown in (B) of FIG. 9 and is scanned for reproduction by rotary magnetic heads 84A and 84B provided at an angular interval of 180° therebetween on the cylinder 83. When the rotation speed of the cylinder 83 is selected to be equal to that of the cylinder 81 shown in (A) of FIG. 9, the digital signal is intermittently reproduced as shown in (B) of FIG. 10. In this case, the period of signal presence is ⅓ of the period of signal absence, and this period of signal presence is ½ of that shown in (A) of FIG. 10.

That is, when it is supposed that the playback mode shown in (A) of FIG. 9 is an ordinary playback mode, the playback mode shown in (B) of FIG. 9 is a double-speed playback mode. This is because, in the playback mode shown in (B) of FIG. 9, the rotary heads 84A and 84B rotate at a speed two times as high as that of the rotary heads 82A and 82B in the playback mode shown in (A) of FIG. 9. (The traveling speed of the magnetic tape 80 in this case is two times as high as that in the ordinary playback mode.) It will be seen from (A) and (B) of FIG. 10 that the time base of the reproduced digital signal in the case of the double-speed playback mode is compressed to ½ of that of the ordinary playback mode, and, therefore, the transmission speed is doubled in the former case.

The prior art signal processing circuit may be able to produce a clock signal synchronous with the digital signal intermittently reproduced in the ordinary playback mode. However, in the prior art signal processing circuit, the oscillation frequency of the single crystal oscillator is used as the basic frequency, and the clock signal is produced by the PLL circuit. Therefore, when the playback mode is switched over to the double-speed playback mode in which the transmission speed of the reproduced digital signal differs greatly from that in the ordinary playback mode, the PLL circuit cannot follow up the reproduced digital signal. As a result, a clock signal synchronized with the reproduced digital signal cannot be obtained, and processing including error correction of the reproduced digital signal cannot be achieved.

SUMMARY OF THE INVENTION

With a view to obviate the prior art defect pointed out above, it is a primary object of the present invention to provide a digital signal reproducing apparatus which can accurately reproduce a digital audio signal such as a music signal not only in the ordinary playback mode but also in a multiple-speed playback mode such as a double-speed playback mode in which the transmission speed of the reproduced digital signal is changed from that of the ordinary playback mode.

The present invention which attains the above object is featured by the fact that the frequency of a basic clock signal having a fixed frequency is divided to produce a clock signal used for processing a digital signal, and, when the transmission speed of the digital signal is changed, the frequency division ratio is also changed so as to produce a clock signal synchronized with the digital signal transmitted at the changed transmission speed.

DESCRIPTION OF THE PREFERRED EMBODIMENTS

Preferred embodiments of the present invention will now be described in detail with reference to the drawings.

Figure 1:
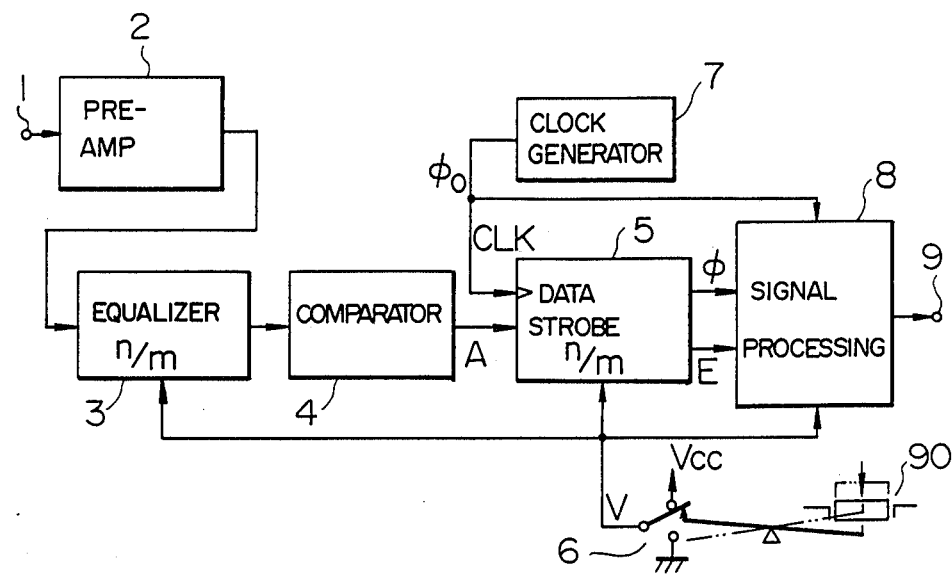
FIG. 1 is a block diagram showing the structure of an embodiment of the digital signal reproducing apparatus according to the present invention.

FIG. 1 is a block diagram showing the structure of an embodiment of the digital signal reproducing apparatus according to the present invention. The digital signal reproducing apparatus includes an input terminal 1, a pre-amplifier 2, an equalizer 3, a comparator 4, a data strobe circuit 5, a selector switch 6, a clock generator 7, a signal processing circuit 8, an output terminal 9, and a manipulating key 90.

Referring to FIG. 1, a digital signal reproduced from a recording medium (not shown) is applied from the input terminal 1 to the pre-amplifier 2 to be amplified. After the amplification, the digital signal is applied to the equalizer 3 where an inter-symbol interference or the like attributable to deviation of the frequency characteristics of the transmission path including the recording medium is removed from the digital signal. The digital signal appearing at the output of the equalizer 3 is applied to the comparator 4 where the waveform of the digital signal is shaped to appear as an output signal A of levels "1" and "0". The digital output signal A is applied to the data strobe circuit 5 together with a basic clock signal $\phi_o$ applied from the clock generator 7. The data strobe circuit 5 divides the frequency of the basic clock signal $\phi_o$ to produce a clock signal $\phi$ synchronized with the strobed digital signal E and applies this clock signal $\phi$ to the signal processing circuit 8 together with the digital output signal E. This signal processing circuit 8 is actuated by the basic clock signal $\phi_o$ applied from the clock generator 7 and utilizes the clock signal $\phi$ for processing including error correction of the digital signal E. The digital signal processed in the signal processing circuit 8 is applied to the output terminal 9.

The digital signal applied to the input terminal 1 is that reproduced in, for example, an ordinary playback mode or a double-speed playback mode, and the digital signal reproduced in the latter mode has a transmission speed different from that reproduced in the former mode. Therefore, the selector switch 6 is provided to be changed over by depression of the manipulating key 90, so that the frequency division ratio in the data strobe circuit 5 can be selected to meet the transmission speed of the digital signal. Thus, the clock signal $\phi$ appearing from the data strobe circuit 5 is always synchronized with the digital output signal E irrespective of the transmission speed. Therefore, the speed of processing including error correction in the signal processing circuit 8 changes in proportion to a change in the transmission speed of the digital signal E so that the digital signal E can be accurately processed at all times.

Also, the frequency characteristic of the equalizer 3 for the digital input signal to be equalized changes depending on the transmission speed of the digital input signal. Therefore, under control of a voltage V applied from the selector switch 6, the frequency characteristic of the equalizer 3 is changed over to meet the transmission speed of the digital input signal so that the frequency characteristic can be optimized at all times.

Figure 2:
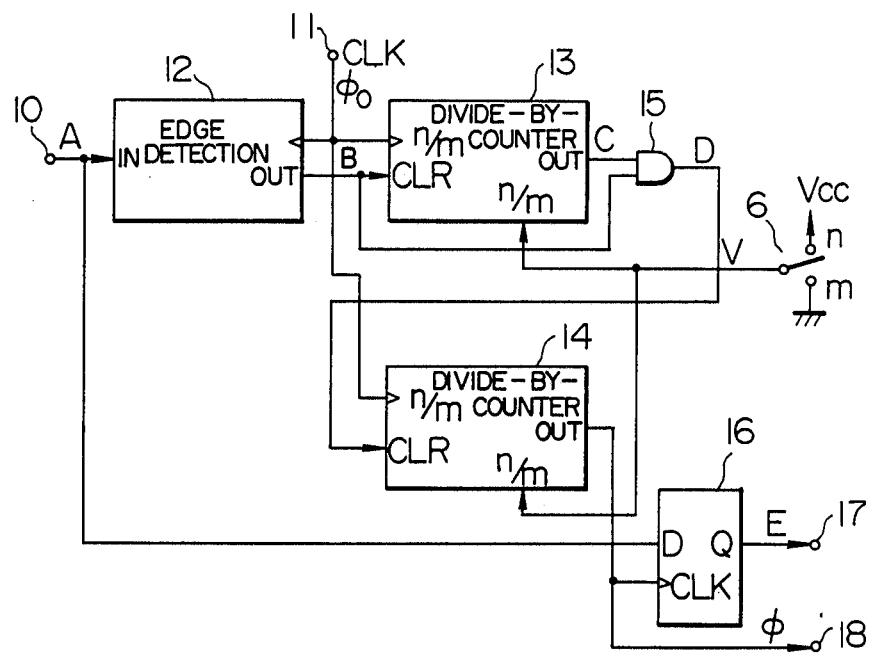
FIG. 2 is a block diagram showing the practical structure of one form of the data strobe circuit shown in FIG. 1.

FIG. 2 is a block diagram showing the practical structure of one form of the data strobe circuit 5 shown in FIG. 1. In the form shown in FIG. 2, the data strobe circuit 5 includes input termnals 10 and 11, an edge detecting circuit 12, divide-by-n/m counters 13 and 14, an AND circuit 15, a D-type flip-flop 16, and output terminals 17 and 18.

Referring to FIG. 2, the digital signal A from the comparator 4 (FIG. 1) is applied to the input terminal 10. When the transmission speed of the digital signal A in, for example, the ordinary playback mode is expressed as $f_{Tr}$, the frequency of the basic clock signal $\phi_o$ applied to the input terminal 11 is n times as high as the signal transmission speed $f_{Tr}$. (That is, the frequency of the basic clock signal $\phi_o$ is n x $f_{Tr}$.) Each of the counters 13 and 14 can be changed over between a divide-by-n counter and a divide-by-m counter depending on the level of the voltage V applied from the selector switch 6. The counter 13 counts the basic clock pulses $\phi_o$ applied from the input terminal 11 and is cleared by an edge detection signal B applied from the edge detecting circuit 12 which detects the edges of the digital signal A. The counter 14 counts the basic clock pulses $\phi_o$ applied from the input terminal 11 and is cleared by an output pulse D of the AND circuit 15 which receives the edge detection signal B and an output signal C of the counter 13 as its inputs. It is supposed herein that the counters 13 and 14 act as divide-by-n counters when the voltage V applied from the selector switch 6 is in its high level and as divide-by-m counters when the voltage V is in its low level.

Figure 3A:
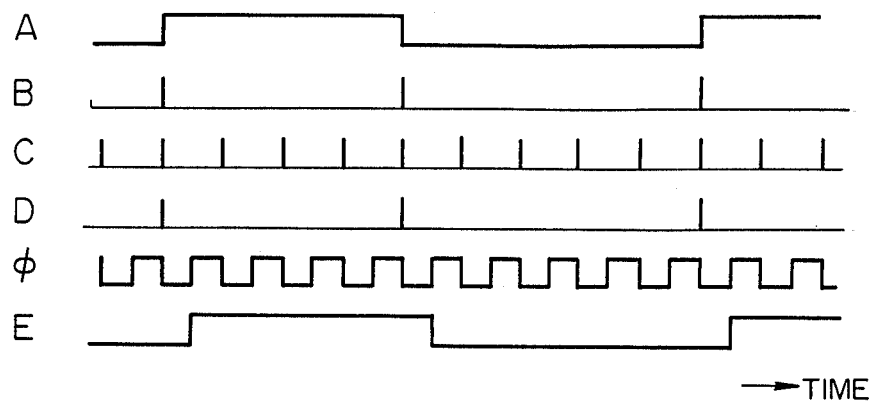
FIG. 3 consisting a (A) and (B), is a timing chart illustrating the operation of the data strobe circuit shown in FIG. 2.
Figure 3B:
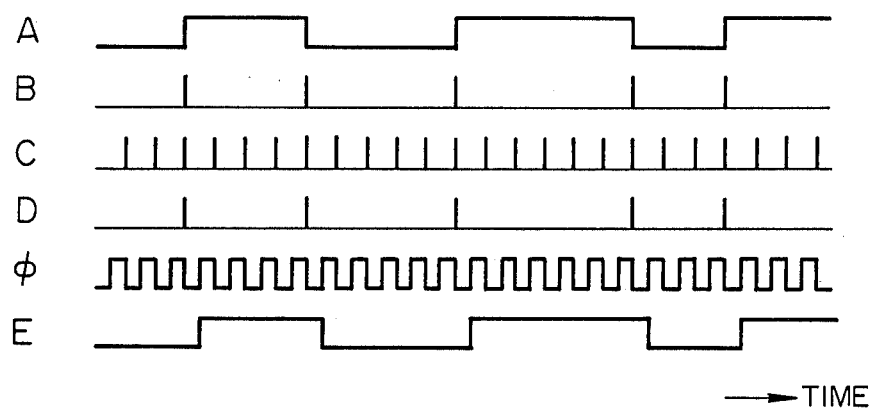

The values of n and m are now set at n=8 and m=4, and the operation of the data strobe circuit 5 shown in FIG. 2 will be described with reference to FIG. 3. Individual signals shown in FIG. 3 are labeled with the same symbols as those of the corresponding signals shown in FIG. 1.

The operation of the data strobe circuit 5 in response to the application of the digital signal A transmitted at the ordinary transmission speed $f_{Tr}$ will be described with reference to (A) of FIG. 3.

The basic clock signal $\phi_0$ whose frequency is $8 \times f_{Tr}$ is applied to the input terminal 11, and, since the voltage V of high level is applied from the selector switch 6, the counters 13 and 14 operate as octal counters. Therefore, as shown in (A) of FIG. 3, the counter 13 is cleared by the edge detection signal B of the digital signal A and provides the octal counting operation. Therefore, the counter 13 generates the pulse signal C with the period of the transmission speed $f_{Tr}$ of the digital signal A. This pulse signal C and the output signal B of the edge detection circuit 12 are applied to the AND circuit 15, and the output of the AND circuit 15 provides a true edge detection signal D indicative of the coincidence of the edge-to-edge time of the digital signal A with the data transmission speed $f_{Tr}$. Thus, a spurious edge such as an edge spuriously occurring in the digital signal A is removed, and the accurate phase information of the digital signal A can be provided. The counter 14 is cleared by the output pulse D from the AND circuit 15 and provides the octal counting operation. The counter 14 generates a clock signal $\phi$ having the frequency $f_{Tr}$ and applies this clock signal $\phi$ to the D-type flip-flop 16, so that the digital signal A can be accurately fetched in synchronism with the rising edges of the clock signal $\phi$. Therefore, the digital output signal E and the clock signal $\phi$ are synchronized.

Next, the operation of the data strobe circuit 5 in response to the application of the digital signal A transmitted at a transmission speed two times as high as the ordinary one or $2 \times f_{Tr}$ will be described with reference to (B) of FIG. 3.

The frequency of the basic clock signal $\phi_0$ applied to the input terminal 11 is $8 \times f_{Tr}$ as in the case where the digital signal A is applied at the ordinary transmission speed. On the other hand, since the voltage V of low level is now applied from the selector switch 6, the counters 13 and 14 operate as quaternary counters. Therefore, the counter 13 is cleared by the edge detection signal B of the digital signal A and provides the quaternary counting operation. The counter 13 generates the pulse signal C with the period of the transmission speed $2f_{Tr}$ of the digital signal A. Thus, the accurate phase information of the digital signal A can be obtained from the AND circuit 15 as in the case where the digital signal A is transmitted at the ordinary transmission speed $f_{Tr}$. The counter 14 is cleared by the pulse signal C and provides the quaternary counting operation. The counter 14 generates a clock signal $\phi$ having the frequency $2f_{Tr}$ and applies this clock signal $\phi$ to the D-type flip-flop 16, so that the digital signal A can be accurately fetched in synchronism with the rising edges of the clock signal $\phi$.

In the manner described above, data-fetching clock signals $\phi$ corresponding to respective transmission speeds of a digital signal can be produced without changing the frequency of the basic clock signal $\phi_0$ applied to the input terminal 11.

Figure 4:
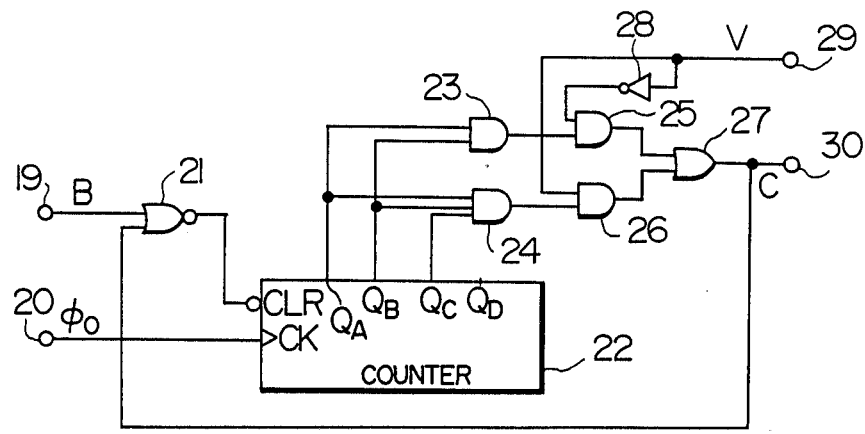
FIG. 4 is a block diagram showing the practical structure of one form of the counters shown in FIG. 2.

FIG. 4 is a block diagram showing the practical structure of one form of the counter 13 shown in FIG. 2. In the form shown in FIG. 4, the counter 13 includes input terminals 19 and 20, a NOR circuit 21, a counter 22, AND circuits 23 to 26, an OR circuit 27, an inverter 28, an input terminal 29, and an output terminal 30.

Referring to FIG. 4, the edge detection signal B from the edge detection circuit 12 shown in FIG. 2 is applied to the input terminal 19, while the basic clock signal $\phi_0$ from the clock generator 7 is applied to the input terminal 20, and the voltage V from the selector switch 6 shown in FIG. 2 is applied to the input terminal 29. The operation of the counter 22 is similar to that of a general-purpose TTL sold by the trade name TTL 74LS163. The counter 22 is cleared each time the edge detection signal B is applied to the input terminal 19 and counts the basic clock pulses $\phi_0$ applied to the input terminal 20. The output of the counter 22 is a 4-bit data where the outputs from individual output terminals $Q_A$ and $Q_D$ represent the least and most significant bits respectively. The outputs from the output terminals $Q_A$ and $Q_B$ are applied as inputs to the AND circuit 23, and the outputs from the output terminals $Q_A$, $Q_B$ and $Q_C$ are applied as inputs to the AND circuit 24. The outputs of the AND circuits 23 and 24 are connected to one of inputs of the AND circuits 25 and 26 respectively. The other input of the AND circuit 26 is connected to the input terminal 29, and this input terminal 29 is also connected to the other input of the AND circuit 25 through the NOT circuit 28. Therefore, one of the AND circuits 25 and 26 is turned on, while the other is turned off, depending on the level of the voltage V applied to the input terminal 29. One of the outputs of the AND circuits 23 and 24 is selected by those AND circuits 25 and 26, and the selected output passes through the OR circuit 27 to be applied as the output pulse signal C to the AND circuit 15 shown in FIG. 2 from the output terminal 30. This output pulse signal C passes also through the NOR circuit 21 to be applied to the counter 22 as a clear pulse.

When now the voltage V of high level is applied to the input terminal 29, the AND circuit 26 is turned on, and the output of the AND circuit 24 is selected to provide the output pulse signal C. Thus, after having been cleared by the edge detection signal B, the counter 22 starts to count the basic clock pulses $\phi_0$ and is cleared each time it counts 8 basic clock pulses $\phi_0$. Therefore, the counter 22 operates as the octal counter and produces the pulse signal C having the frequency $f_{Tr}$ which is $\frac{1}{8}$ of the frequency $8 \times f_{Tr}$ of the basic clock signal $\phi_0$. On the other hand, when the voltage V of low level is applied to the input terminal 29, the AND circuit 25 is now turned on, and the output of the AND circuit 23 is selected to provide the output pulse signal C. Thus, the counter 22 operates now as the quaternary counter and produces the pulse signal C whose frequency is $2f_{Tr}$.

In the manner described above, the counter 22 can be changed over between an octal counter and a quaternary counter by changing over the selector switch 6 shown in FIG. 2.

The same applies to the counter 14 shown in FIG. 2. Further, by suitably selecting the number of bit outputs of the counter 22 and the combination of AND circuits processing the bit outputs of the counter 22, the counters 13 and 14 can be changed over between divide-by-n counters and divide-by-m counters other than the octal and quaternary counters.

Figure 5:
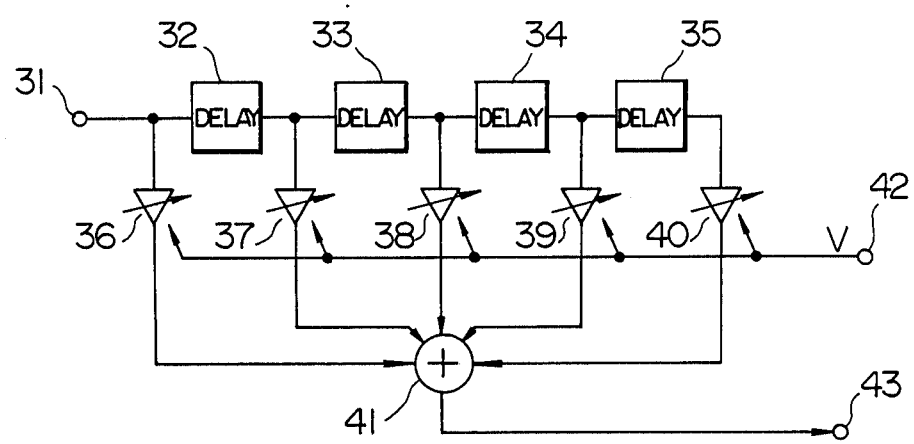
FIGS. 5 and 6 are block diagrams showing the practical structures of two forms respectively of the equalizer shown in FIG. 1.

FIG. 5 is a block diagram showing the practical structure of one form of the equalizer 3 shown in FIG. 1. In the form shown in FIG. 5, the equalizer 3 includes an input terminal 31, delay circuits 32 to 35, variable gain amplifiers 36 to 40, an adder circuit 41, a control terminal 42 controlling the gain of the variable gain amplifiers 36 to 40, and an output terminal 43.

Referring to FIG. 5, the digital signal from the preamplifier 2 is applied to the input terminal 31. The control terminal 42 is connected to the selector switch 6 shown in FIG. 1, so that the gain of the variable gain amplifiers 36 to 40 is changed over according to the level of the voltage V, hence, according to the transmission speed of the digital signal.

In the practical form shown in FIG. 5, the equalizer 3 has the structure of a transversal filter, and, by varying the tap coefficient by the variable gain amplifiers 36 to 40, the frequency can be optimized to meet the transmission speed of the digital signal.

Figure 6:
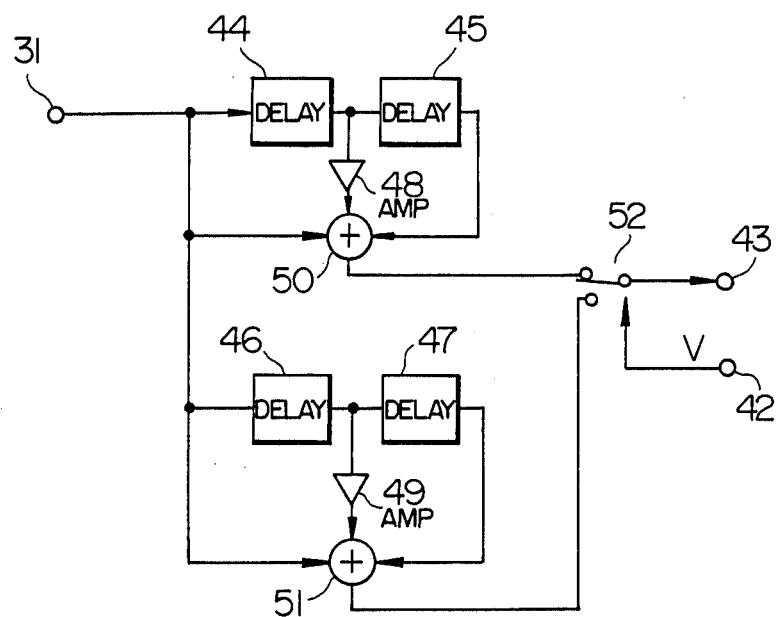

FIG. 6 is a block diagram showing the practical structure of another form of the equalizer 3 shown in FIG. 1. In the form shown in FIG. 6, the equalizer 3 includes delay circuits 44 to 47, amplifiers 48 and 49, adder circuits 50 and 51, and a selector switch 52. In FIG. 6, the same reference numerals are used to designate the same or equivalent parts shown in FIG. 5.

In the form shown in FIG. 6, the delay circuits 44, 45, the amplifier 48 and the adder circuit 50 constitute a transversal filter, and the delay circuits 46, 47, the amplifier 49 and the adder circuit 51 constitute another transversal filter. These transversal filters have different frequency characteristics dealing with different transmission speeds of the digital signal. The selector switch 52 is changed over depending on the level of the voltage V applied to the input terminal 42, so that one of the transversal filters having the frequency characteristic meeting the transmission speed of the digital signal applied to the input terminal 31 is selected.

Figure 7:
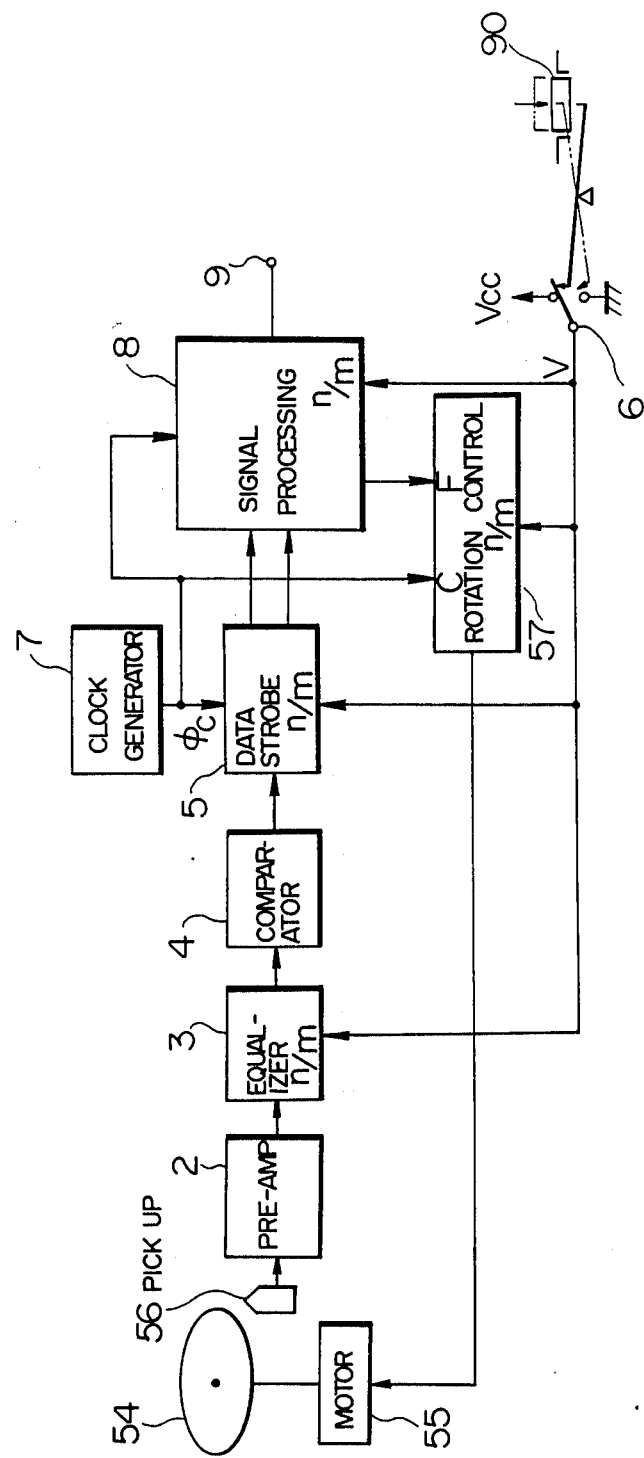
FIG. 7 is a block diagram showing an application of the embodiment of the digital signal reproducing apparatus of the present invention to a CD player.

FIG. 7 is a block diagram showing an application of the embodiment of the digital signal reproducing apparatus of the present invention to a CD player. In FIG. 7, the reference numerals 54, 55, 56, and 57 designate a disk, a motor, an optical pickup, and a rotation speed control circuit respectively, and the same reference numerals are used to designate the same or equivalent parts appearing in FIG. 1.

Referring to FIG. 7, the motor 55 drives the disk 54 at a rotation speed determined by the rotation speed control circuit 57. The basic clock signal $\phi_o$ from the clock generator 7 is applied to the rotation speed control circuit 57, and a frame synchronization signal corresponding to the rotation speed of the disk 54 is also applied to the rotation speed control circuit 57 from the signal processing circuit 8. The rotation speed control circuit 57 is controlled according to the level of the voltage V applied from the selector switch 6 to change over the rotation speed of the motor 55 so that the disk 54 can be driven at a rotation speed which meets a predetermined transmission speed of a digital signal reproduced from the disk 54 by the optical pickup 56.

Figure 8:
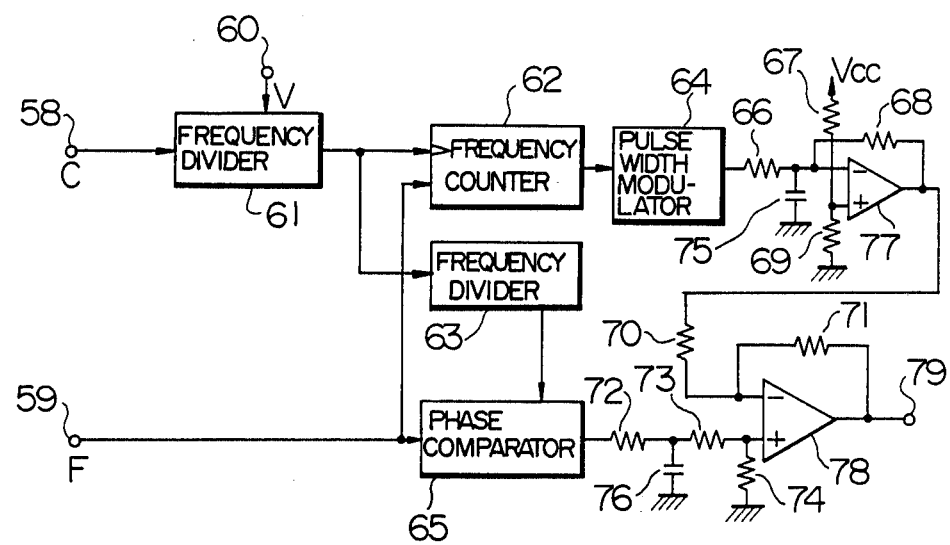
FIG. 8 is a block diagram showing the practical structure of one form of the rotation speed control circuit shown in FIG. 7.
Figure 9A:
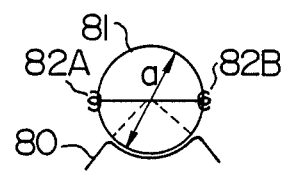
FIG. 9 consisting of (A) and (B) illustrates an example of systems in which a digital signal is transmitted at different speeds in a DAT recorder.
Figure 9B:
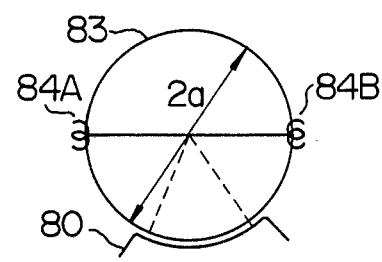
Figure 10A:
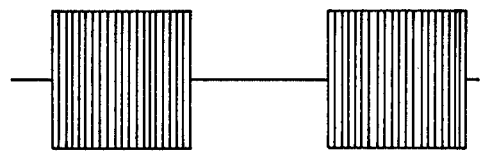
FIG. 10 consisting of (A) and (B) shows the waveforms of the digital signal in the systems shown in FIG. 9.
Figure 10B:

FIG. 8 is a block diagram showing the practical structure of one form of the rotation speed control circuit 57 shown in FIG. 7. In the form shown in FIG. 8, the rotation speed control circuit 57 includes an input terminal 58 to which the basic clock signal $\phi_o$ is applied, another input terminal 59 to which the frame synchronization signal detected in the signal processing circuit 8 is applied, a control terminal 60 to which the voltage V is applied from the selector switch 6, a frequency divider 61 dividing the frequency of the basic clock signal $\phi_o$ by the factors of n and m when the level of the voltage V applied to the control terminal 60 from the selector switch 6 is high and low respectively, a frequency counter 62 for speed detection purpose which counts the frequency of the frame synchronization signal applied to the input terminal 59, another frequency divider 63, a pulse width modulator 64 controlling the pulse width of the output of the frequency counter 62, a phase comparator 65 comparing the phase of the output of the frequency divider 63 with that of the frame synchronization signal, resistors 66 to 74, capacitors 75 and 76, an amplifier 77, another amplifier 78 amplifying the sum of the PWM speed detection signal generated from the pulse width modulator 64 and the phase detection signal generated from the phase comparator 65, and an output terminal 79 at which an output signal for controlling the motor 55 appears.

In the rotation speed control circuit 57 having the structure shown in FIG. 8, the frequency divider 61 divides the frequency of the basic clock signal $\phi_o$ by the factor of n in the ordinary playback mode, and, on the basis of the frequency of the output of the frequency divider 61, the frequency counter 62 and the phase comparator 65 carry out the speed detection and phase detection respectively. On the other hand, when the rotation speed of the disk 54 is to be changed to a value n/m times as high as the existing value, the manipulating key 90 is depressed to change over the selector switch 6 thereby applying the voltage V of low level to the control terminal 60. Due to the application of the voltage V of low level, the frequency divider 61 divides the frequency of the basic clock signal $\phi_o$ by the factor of m.

Suppose now that the values of n and m are selected as n=16 and m=8 respectively so as to reproduce the digital signal at a speed two times as high as that in the ordinary playback mode. In such a case, the frequency of the output of the frequency divider 61 is two times as high as that in the ordinary playback mode. Since now the frequency of the reference signal applied to the frequency counter 62 and phase comparator 65 is doubled, the motor 55 driving the disk 54 rotates at a rotation speed two times as high as that in the ordinary playback mode.

In the CD player shown in FIG. 7, the rotation speed of the disk 54 is controlled by the rotation speed control circuit 57, and the reproduced digital signal can be derived at the rate corresponding to the transmission speed by the function of the data strobe circuit 5. According to this embodiment, therefore, the change-over of the selector switch 6 changes the frequency of the reference signal applied to the rotation speed control circuit 57 thereby changing the rotation speed of the motor 55 in spite of the provision of the single clock generator 7. Thus, regardless of a change in the transmission speed of the reproduced digital signal, the reproduced digital signal can be fetched by the data strobe circuit 5 and processed by the signal processing circuit 8, so that signal reproduction at a variable speed can be realized.

Figure 11:
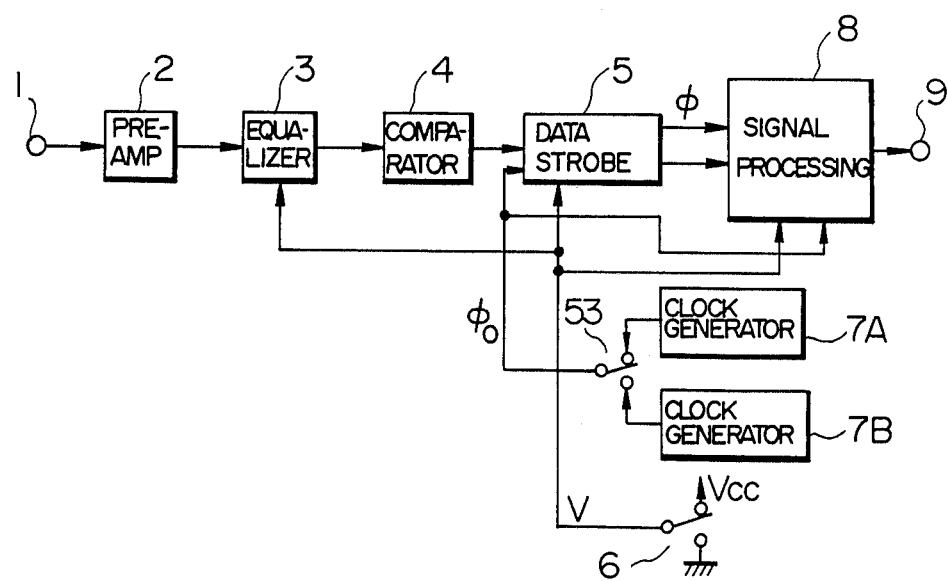
FIG. 11 is a block diagram showing the structure of another embodiment of the digital signal reproducing apparatus according to the present invention.

FIG. 11 is a block diagram showing the structure of another embodiment of the digital signal reproducing apparatus according to the present invention. In FIG. 11, the reference numerals 7A and 7B designate clock generators generating different clock frequencies, and 53 designates a selector switch. The same reference numerals are used in FIG. 11 to designate the same or equivalent parts appearing in FIG. 1.

The embodiment shown in FIG. 1 includes only one clock generator 7 and is therefore used for the reproduction of a digital signal whose transmission speed in a multiple-speed playback mode has a discrete value such as n/m times as high as that in the ordinary playback mode. In contrast, in the case of the embodiment shown in FIG. 11, the two clock generators 7A and 7B generating clock signals having different frequencies are used, and these clock signals are selectively changed over by the selector switch 53. Thus, the embodiment shown in FIG. 11 can deal with a digital signal having more transmission speeds.

It is apparent that three or more clock generators may be provided to deal with a digital signal transmitted at any transmission speed.

A practical application of this embodiment will now be described.

Figure 12A:
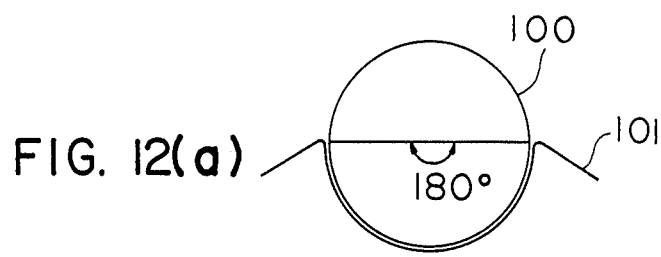
FIGS. 12(a) and (b) and 13 (a) and (b) illustrate the relation between a rotary cylinder and a tape winding angle in a DAT recorder to which the embodiment shown in FIG. 11 is applicable.
Figure 12B:
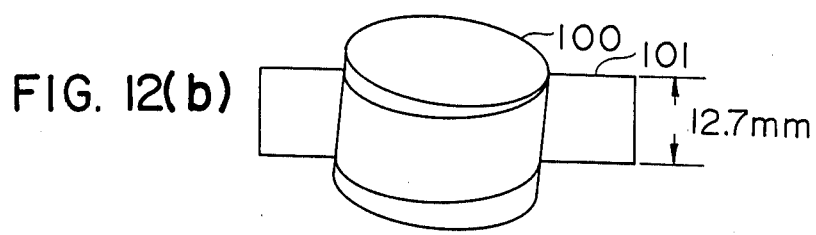
Figure 13A:
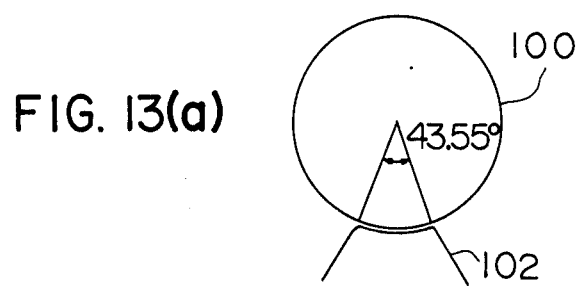
Figure 13B:
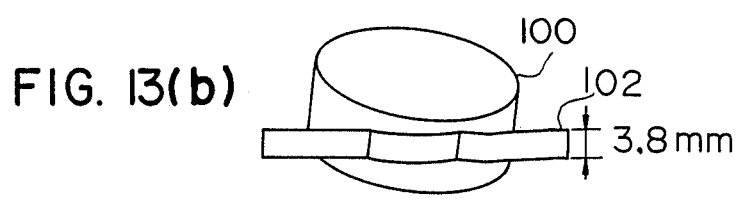

FIG. 12 illustrates that a magnetic tape 101 is brought into contact with a cylinder 100 of a DAT recorder. This cylinder 100 is similar to that used in a video tape recorder. The diameter of the cylinder 100 is 62 mm, the width of the magnetic tape 101 is 12.7 mm, and the tape winding angle A is 180°. FIG. 13 illustrates that another magnetic tape 102 having a width of 3.8 mm is brought into contact with the cylinder 100 shown in FIG. 12 at a tape winding angle B of 43.55°.

Figure 14:
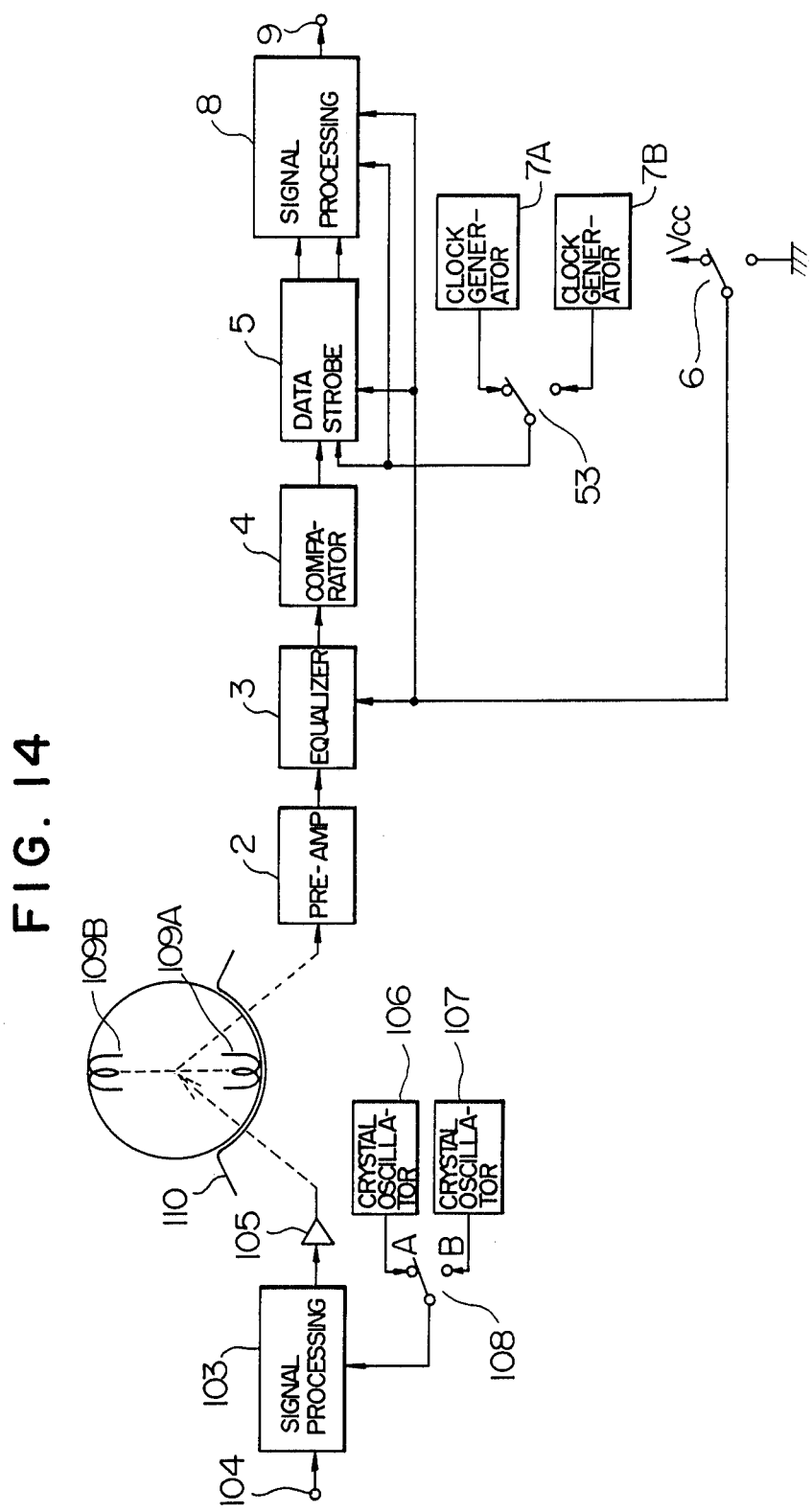
FIG. 14 is a block diagram showing the structure of an apparatus adapted for recording and reproduction of the same recording format on and from the different tapes shown in FIGS. 12 and 13.

FIG. 14 is a block diagram showing the structure of an apparatus adapted for recording and reproduction of the same recording format on and from the different magnetic tapes shown in FIGS. 12 and 13.

Referring to FIG. 14, a digital signal to be recorded is applied to an input terminal 104, and a signal processing circuit 103 in a recording system adds an error correcting code and a synchronizing signal to the digital signal, and, after modulation, applies the digital signal to a recording amplifier 105. Crystal oscillators 106 and 107 generate basic clock signals having different frequencies. The basic clock signals generated from the crystal oscillators 106 and 107 are selectively changed over by a selector switch 108, and the selected clock signal is applied to the signal processing circuit 103 in the recording system. The digital output signal of the recording amplifier 105 is applied to rotary magnetic heads 109A and 109B to be recorded on a magnetic tape 110.

In the playback mode, the digital signal is reproduced by the rotary heads 109A and 109B and is applied to the pre-amplifier 2 in the circuit shown in FIG. 11.

The operation of the apparatus shown in FIG. 14 will be described in further detail. Consider now the case of recording a digital signal on the magnetic tape 101 shown in FIG. 12. In order to provide a transmission speed $f_{Tr}$ in the record mode, the selector switch 108 is changed over to its side A to connect the crystal oscillator 106 to the signal processing circuit 103 in the recording system so as to apply the basic clock signal from the crystal oscillator 106 to the signal processing circuit 103. The crystal oscillator 106 has an oscillation frequency providing the transmission speed $f_{Tr}$.

In the playback mode, the selector switch 6 is changed over so that the counters 13 and 14 in the data strobe circuit 5 operate as hexadecimal counters. The selector switch 53 is also changed over to select the clock generator 7A which has an oscillation frequency of $16 \times f_{Tr}$. Thus, the data strobe circuit 5 samples the digital signal to fetch data at the frequency sixteen times as high as the transmission speed $f_{Tr}$.

On the other hand, in order to record a digital signal of the same recording format as that of FIG. 12 on the magnetic tape 102 shown in FIG. 13, it is necessary that the transission speed be $180°/43.55° = 4.13$ times as high as the former transmission speed, because the tape winding angle in FIG. 13 differs from that in FIG. 12. Therefore, the oscillation frequency of the crystal oscillator 107 is selected to be 4.13 times as high as that of the crystal oscillator 106, and the selector switch 108 is changed over to its side B to apply the basic clock signal having such a frequency from the crystal oscillator 107 to the signal processing circuit 103 in the recording system. Thus, a digital signal having a transmission speed of $4.13 \times f_{Tr}$ is applied to the recording amplifier 105 to be recorded on the magnetic tape 102.

In the playback mode, the reproduced digital signal having the transmission speed of $4.13 f_{Tr}$ is applied to the pre-amplifier 2. The selector switch 6 is changed over so that the counters 13 and 14 in the data strobe circuit 5 operates now as quaternary counter. The selector switch 53 is also changed over to select the clock generator 7B having an oscillation frequency of $16.52 f_{Tr}$. Thus, the data strobe circuit 5 samples the digital signal to fetch data at the frequency four times as high as the transmission speed.

Thus, in the apparatus shown in FIG. 14, the required clock frequency in the case of the signal reproduction from the magnetic tape 102 of FIG. 13 is only $16.52 f_{Tr}/16 f_{Tr} = 1.03$ times as high as that in the case of the signal reproduction from the magnetic tape 101 of FIG. 12 in spite of the fact that the transmission speed in the former case is 4.13 times as high as that in the latter case, and the digital signal can be reproduced without appreciably increasing the operating speed of the signal processing circuit 8 in the reproducing system.

It will be seen that, according to the digital signal reproducing apparatus shown in FIG. 14, data can be accurately fetched by the single signal processing circuit irrespective of whether a digital signal is reproduced from a magnetic tape by magnetic heads mounted on cylinders having different diameters or the same diameter, that is, irrespective of different tape winding angles. Therefore, provision of independent digital signal processing circuits to deal with different tape winding angles is unnecessary, and the cost of a magnetic recording and reproducing apparatus of a rotary head type (a DAT recorder) can be reduced.

It will be understood from the foregoing detailed description of the present invention that a digital signal having different transmission speeds can be accurately fetched by the use of an oscillator having a fixed oscillation frequency, and the operating speed of processing elements need not be changed depending on the transmission speed. Therefore, the digital signal reproducing apparatus of the present invention, which solves the prior art problems and exhibits an excellent function, can be applied in common to a plurality of systems operating at different transmission speeds.

What is claimed is:

1. A digital audio signal reproducing apparatus for reproducing the digital audio signals recorded on a disk with a predetermined line speed and a predetermined sampling frequency, comprising:
   switching means for switching between a first reproduction transmission rate which is equal to the recorded transmission rate and a second reproduction transmission rate which is N times (N is an integer > 1) the recorded transmission rate;
   equalizing means, responsive to said switching means, for switching the frequency characteristic of the digital audio signals reproduced from said disk;
   clock reproducing means for reproducing clock signals synchronized with said first and second reproduction transmission rates after shaping the output from said equalizing means;
   signal processing means for detecting and correcting errors generated in the reproduced signals and for outputting said reproduced signals to a D/A converter;

control means for controlling rotation speed of said disk by the freuqency of synchronized signal detected in said reproduced signal;

oscillating means for oscillating at a fixed frequency; and dividing means for dividing an output from said oscillating means by N such that an output from said dividing means can be used as a reference signal for said controlling means and said signal processing means.

2. A digital audio signal reproduction apparatus according to claim 1, wherein said clock reproducing means includes a small phase error at said first reproduction transmission rate and a large phase error at said second reproduction transmission rate.

3. A digital audio signal reproduction apparatus according to claim 2, wherein said clock reproducing means is digital data strobe circuit.

* * * * *